United States Patent [19]

Kottke

[11] Patent Number: 4,655,729

[45] Date of Patent: Apr. 7, 1987

[54] FLEXIBLE CABLE ASSEMBLY

[75] Inventor: Louis E. Kottke, Adrian, Mich.

[73] Assignee: Acco Babcock Inc., Fairfield, Conn.

[21] Appl. No.: 625,601

[22] Filed: Jun. 28, 1984

[51] Int. Cl.⁴ .............................................. F16C 1/26
[52] U.S. Cl. .................................. 464/58; 74/501 P; 464/174
[58] Field of Search ................... 74/501 P; 464/57, 58, 464/60, 173, 174, 181, 183

[56] References Cited

U.S. PATENT DOCUMENTS

| | | |
|---|---|---|
| 2,382,966 | 9/1945 | Arens . |
| 2,706,417 | 4/1955 | Waner ............................... 464/58 X |
| 2,831,737 | 4/1958 | Jacoby . |
| 2,850,915 | 9/1958 | Bratz . |
| 3,117,371 | 1/1964 | Farley . |
| 3,214,995 | 11/1965 | Gilmore ........................... 464/174 X |
| 3,238,808 | 3/1966 | Barnard ............................ 464/57 X |
| 3,240,233 | 3/1966 | Johnston . |
| 3,302,479 | 2/1967 | Conrad . |
| 3,435,634 | 4/1969 | Chatham ............................. 464/174 |
| 3,481,156 | 12/1969 | Csipkes ............................. 464/57 X |
| 3,581,523 | 6/1971 | Bartholomew ................. 464/174 X |
| 3,812,738 | 5/1974 | Courtot ........................... 74/501 P X |
| 4,112,708 | 9/1978 | Fukuda ............................. 464/57 X |

FOREIGN PATENT DOCUMENTS 1045184 5/1959 Fed. Rep. of Germany .
1294854 11/1962 France .

Primary Examiner—Stuart S. Levy
Assistant Examiner—Daniel P. Stodola
Attorney, Agent, or Firm—Pennie & Edmonds

[57] ABSTRACT

A flexible cable assembly for actuation of an automobile speedometer or the like, comprising an inner core member and a tubular casing that includes an outer housing and a spiral-cut tubular liner with multiple internal ribs. The liner is constructed by extruding a cylindrical tube with at least one internal longitudinally extending rib. The tube is then cut helically so as to offset circumferentially the rib segments on adjacent turns of the strip, providing multiple internal supports for the core member.

16 Claims, 6 Drawing Figures

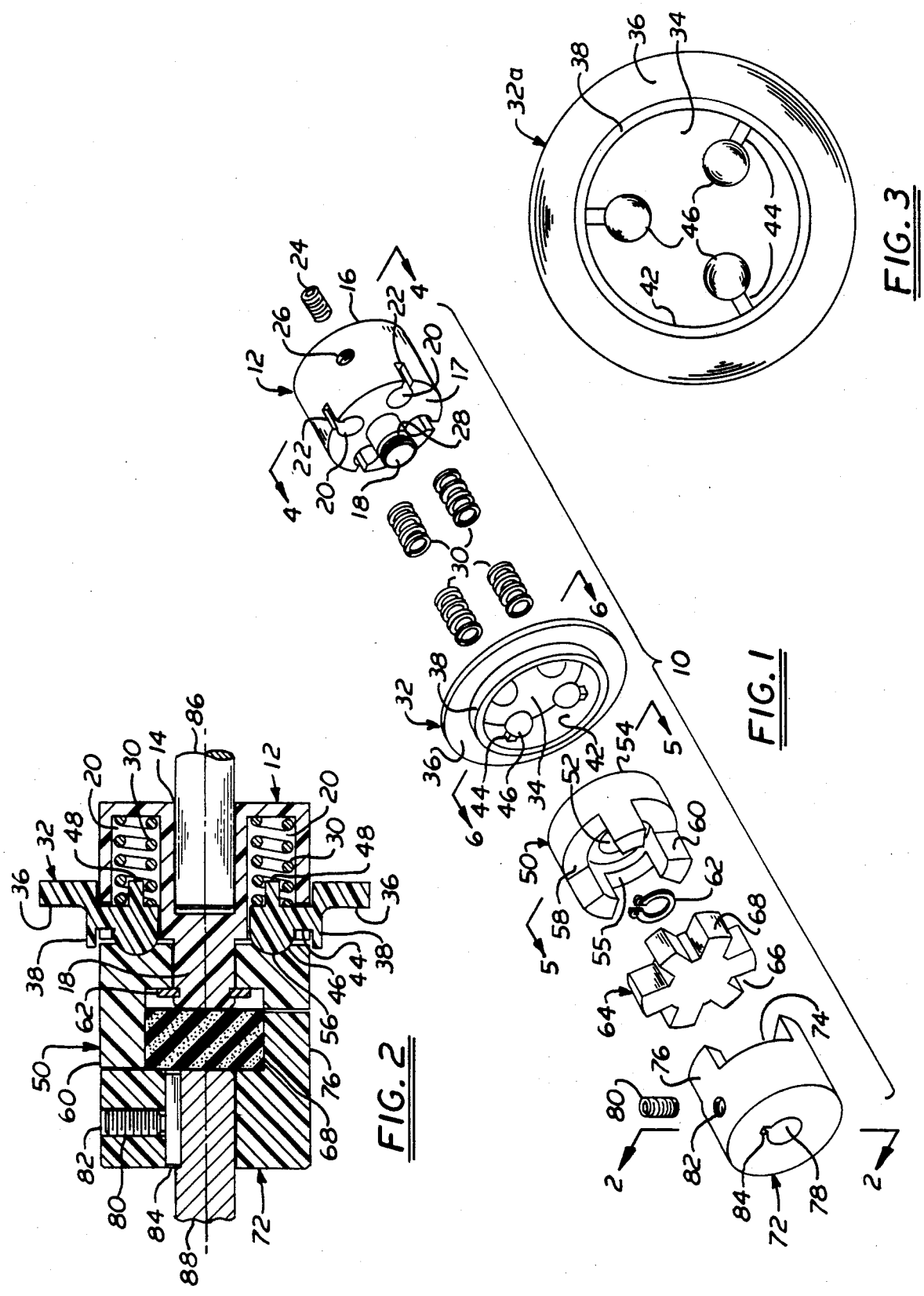

FLEXIBLE CABLE ASSEMBLY

BACKGROUND OF THE INVENTION

1. Field of the Invention

The present invention relates to flexible cable assemblies for rotary actuation, as in an automobile speedometer or tachometer cable, or for linear actuation, for example in a push-pull remote control cable. It relates more particularly to an assembly comprising a spiral-cut tubular plastic liner with multiple internal ribs, within a tubular outer housing, the liner and housing together forming a tubular casing for supporting a power-transmitting core member. The ribs on adjacent spiral turns of the liner are offset from one another and support the center core member at spaced locations, resulting in quiet and smooth cable operation. The invention also relates to a method of manufacturing the plastic liner of the cable assembly.

2. Description of the Prior Art

Prior cable assemblies having internal liner structures with spaced supports for the center core member are disclosed in U.S. Pat. Nos. 3,581,523 (Bartholomew), 3,481,156 (DeCsipkes), and 3,240,233 (Johnston). Such constructions are also disclosed in French Pat. No. 1,294,854 (1962) and German Pat. No. 1,045,184 (1959).

The Bartholomew patent discloses a continuous tubular conduit liner having an inside surface provided with ribs extending inwardly from the liner to contact the center core member and resist radial movement. The ribs are integrally formed on the liner and are equally spaced around its inside circumference. The ribs may alternatively comprise a series of short rib sections extending either longitudinally or circumferentially on the liner. The Bartholomew construction is said to exhibit low noise during operation (col. 2, lines 31-32). Nevertheless, a ribbed liner constructed in accordance with Bartholomew provides support only every 60° or 90° about the center core member. This leaves other circumferential sections of the shaft unsupported and therefore subject to radial movement and possible contact with the tubular conduit liner. Such movement can also create noise.

Another potential disadvantage of the Bartholomew liner is that a lubricant disposed between the shaft and the liner may be pumped upward or downward within the liner by the rotation of the shaft. Flexible shafts are commonly formed of multiple layers of wire. The layers are wound so that successive layers have alternating directions of winding or lay about the central wire. The outer screw-like surface of such a shaft can act as a pump, particularly if the interior of the conduit is smooth, or if the shaft and any interior texture of the conduit liner have opposite lays. Thus, if the shaft surface has a left-hand lay (that is, the turns in the shaft surface are oriented from lower-right to upper-left as the shaft is viewed in a vertical position), upward pumping may result if the shaft is rotated clockwise as seen from its lower end, i.e., opposite to the direction of the lay.

Cable assemblies having ribbed sleeve members similar to Bartholomew are disclosed in the above-mentioned DeCsipkes and Johnston patents as well as in the French and German patents. The purpose of these constructions is also said to be the reduction of noise and friction.

U.S. Pat. Nos. 2,382,966 (Arens), 2,831,737 (Jacoby) and 3,435,634 (Chatham) disclose further cable type constructions wherein the inner core member is supported by sleeve members having a ribbed or discontinuous inner supporting surface.

The prior art further includes plastic members that are deformed inwardly by the pressure of a helically-wrapped outer structure to form a helical ridge for supporting a center core member. See U.S. Pat. Nos. 3,302,479 (Conrad) and 3,214,995 (Gilmore).

Additionally, the prior art includes helically or spirally wound liner members for supporting an inner core member. Examples of these constructions are disclosed in U.S. Pat. Nos. 3,238,808 (Barnard) and 2,850,915 (Bratz). In Barnard and Bratz the helical or spiral liner is said to improve flexibility, increase lubricant capacity and retention, and reduce noise levels of the assembly.

SUMMARY OF THE INVENTION

One general purpose of the present invention is to improve on these prior devices by providing a flexible cable assembly with a liner having improved flexibility, lubricant capacity, lubricant retention, and noise reduction. A further purpose is to provide an inexpensive and simple method of manufacturing a liner for a flexible cable assembly.

According to an embodiment of the invention, the flexible cable assembly comprises a spiral-cut tubular liner with multiple offset internal ribs for supporting a core member inside an outer housing. The liner is constructed by first extruding a generally cylindrical plastic tube with one or more generally longitudinal internal ribs. The tube is then spirally cut, which results in a helically spiralled strip having the multiple offset ribs on its inner surface.

The longitudinal offsetting or misalignment of the ribs according to the invention results in better bearing support and smoother motion of a cable supported in the liner. It also greatly reduces noise levels in comparison with other cable assemblies. One reason for the noise reduction is that the cable assembly is more flexible, so that vibrations in the liner material, for example Nylon or polypropylene, are absorbed. Also, noise transmission is reduced because of the interruptions between the turns of the helical strip. Further, lubrication capacity and retention are much better than in prior systems, because the interaction between the helical cut and the grooved surface of the inner shaft resists the pumping effect.

BRIEF DESCRIPTION OF THE DRAWINGS

FIG. 1 is a perspective view of a liner for use in a preferred embodiment of the invention;

FIG. 2 is a cross-sectional view taken along line 2—2 of FIG. 1;

FIG. 3 shows a cable assembly including the liner of FIG. 1 as well as other features;

DETAILED DESCRIPTION OF A PREFERRED EMBODIMENT

Figure 4:
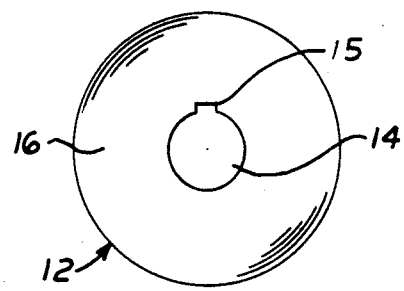
FIG. 4 is an elevational view of apparatus for performing part of the process of manufacturing the liner of FIG. 1.

FIGS. 1 and 2 show a conduit liner 10 for use in a cable assembly according to an embodiment of the invention. The liner 10 is formed of an extruded plastic tube of polypropylene, a polyamide material such as is available under the trademark Nylon, or other similar material. The tube has a plurality of molded internal ribs 14, shown here as six in number and equally spaced. A continuous and regular spiral cut 12 is made along the entire length of the tube, forming a helical strip 11. One of the ribs 14 is shown in phantom, and is seen to have been broken by the cut 12 into a plurality of discontinuous ribs denoted 14a, 14b, etc.

The tube is helically cut by a rotating head with a straight cutting blade in an open central cylindrical aperture through which the tube is fed. The cutting blade projects into the aperture far enough to engage the tube, and is oriented at an angle with respect to the axis of the tube. The blade angle and the rotational speed of the head are such that the spiral cutting proceeds at the same speed as the feeding of the tube into the head.

When the spiral cut is made in the tube, the tube tightens or winds up slightly. The tightening can be caused by either of two factors: mechanical stress exerted by the cutting blade on the tube during the cutting operation; or relief of torsional prestresses in the tube that are created in the extrusion operation. Generally, an extruded tube has a torsional stress throughout its length, and releasing this stress by making a helical cut causes the adjacent turns of the helical strip to shift circumferentially with respect to each other.

The tightening of the cut tube causes the segments of the ribs 14 on adjacent turns of strip 11 to become offset or misaligned. Advantageously, they are circumferentially offset from each other, on any given turn, by about half the distance between the ribs 14. The misaligned ribs, being circumferentially spaced, provide support throughout a full 360° range, resulting in smooth motion of the core member or shaft.

A central aperture 16 (see FIG. 2) is defined by strip 11 and the ribs 14 for accommodating and supporting an inner core member or shaft 22 (see FIG. 3) in contact with the ribs. The lay of the wrapped wires on the outer surface of the core member 22 is the same as that of the spiral cut 12. The core member and spiral cut are shown here to have a left-hand lay. Such a lay relationship is particularly useful for counterclockwise rotation of the core member, that is, in direction A as seen in FIG. 3. When the lay of the spiral-cut helical strip matches in this way both the lay and the direction of rotation of the rotating shaft, the lubricant is essentially suspended within the liner, and upward pumping of the lubricant is prevented. The rotation of the core member in the direction of the lay of the helical strip also opens up the turns of the strip and works the lubricant into the gaps between the turns, where the lubricant then remains. Thus the arrangement provides improved lubricating capacity and retention.

FIG. 3 shows a cable assembly that includes a conduit liner as discussed above. The conduit liner is surrounded by a wire braid strengthening layer 18, which in turn is covered by a soft plastic tubular extrusion 20 to achieve both strength and water-tight integrity. The extruded plastic cover further improves on the reduction of noise obtained by the combination of offset ribs and the spiral cut. The internal strengthening layer may be made of either wire or other materials. For example, conduits of spaced wound flat wire, full complement stranded round wire, or spaced stranded round wire may be used. In some instances when tensile and compressive conduit strength are not a major requirement, the final extrusion can be applied directly over the helical strip.

Figure 5:
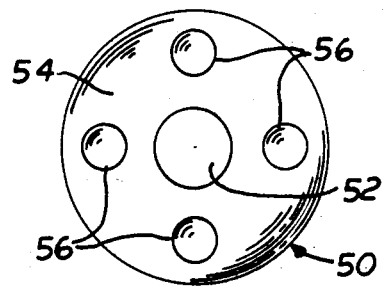
FIG. 5 is an end view of the apparatus of FIG. 4 taken from line 5—5 of FIG. 4.
Figure 6:
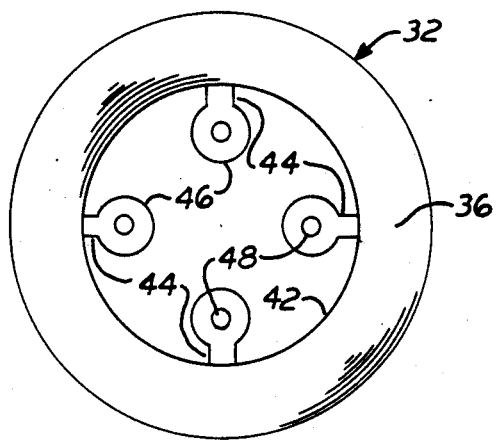
FIG. 6 shows a cutting blade for use in the apparatus of FIGS. 4 and 5.

FIGS. 4–6 show a device for performing part of the process of manufacturing the liner. A cylindrical rotating cutting head 30 has an open cylindrical central aperture 32 into which is fed the ribbed plastic tube to be spiral-cut. The inside diameter of the aperture is about the same as the outside diameter of the tube. A rotating coaxial shaft 44 is attached to the head 30 for receiving a driving force from a power source to rotate the head. A diagonal slot 34 in one side of the head 30 communicates with the exterior of the head and with the central aperture 32. The slot makes a selected angle, designated as x in FIG. 4, with the longitudinal axis of the aperture.

A cutting blade 36 (FIG. 6) is inserted into the slot 34 from the exterior of the head 30, and is secured by set-screws (not shown) in threaded holes 40 and 42 in the head 30. The blade is inserted far enough into the aperture 32 for the cutting edge 38 to engage and cut the tube. Thus, the length of the cutting edge 38 is slightly less than the diameter of a cross-section of the head 30 (see FIG. 5).

The angle x is selected according to several considerations. If the angle is large, the pitch of the spiral cut 12, that is, the spacing between turns, will be small and the conduit liner will be more flexible and better able to maintain its round shape at a bend. On the other hand, cutting to a smaller pitch is slower and thus less economical. Also, a substantial loss of support takes place if the pitch is very small. A desirable pitch range has been found to extend from a preferred pitch of about ¼-inch, up to a maximum of about ⅜-inch.

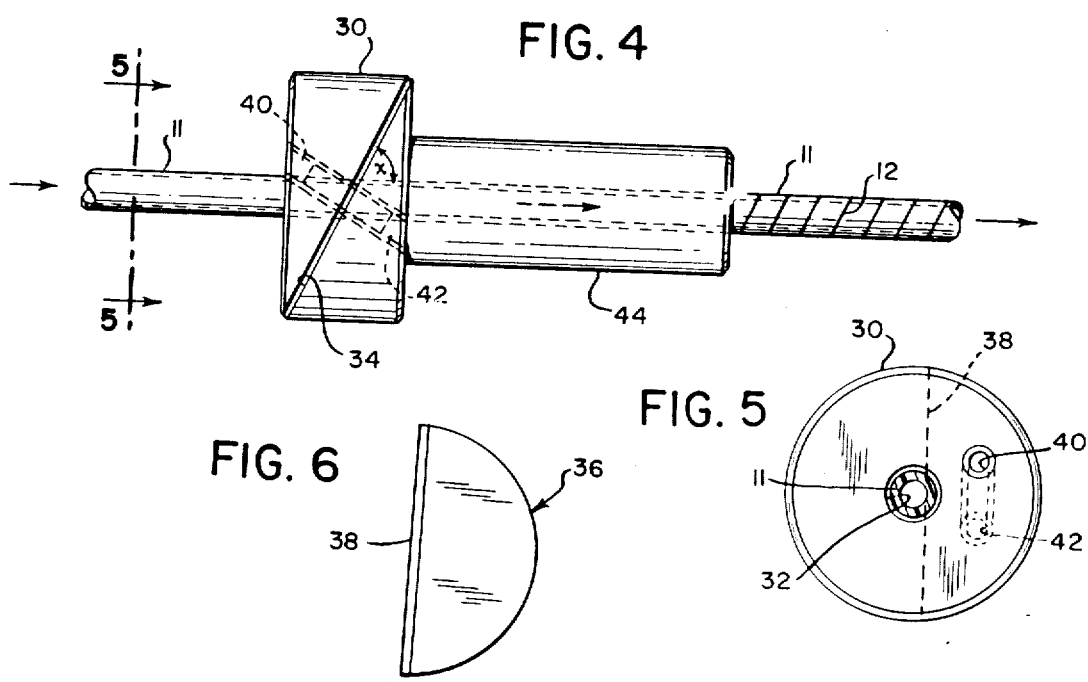

I claim:

1. A flexible cable assembly comprising:
    (a) a power-transmitting core member; and
    (b) a tubular casing supporting said core member for movement therein, said casing including
        (1) an outer housing, and
        (2) an inner plastic tubular-shaped liner having a helical cut along its length to form a helical strip and having radially inwardly extending ribs along its inner wall surface for supporting said core member, said ribs extending substantially longitudinally with respect to the liner and each rib on one side of the helical cut being offset circumferentially with respect to the immediately longitudinally adjacent rib on the other side of the helical cut.

2. A flexible cable assembly according to claim 1 wherein:
    on any one turn along the length of said helical strip of the liner there are a plurality of circumferentially spaced ribs.

3. A flexible cable assembly comprising:
    (a) a power-transmitting core member; and
    (b) a tubular casing supporting said core member for movement therein, said casing including
        (1) an outer housing, and
        (2) an inner plastic tubular-shaped liner having a helical cut along its length to form a helical strip and having radially inwardly extending ribs along its inner wall surface for supporting said core member, said ribs extending substantially longitudinally with respect to the liner and any one rib on one side of the helical cut being offset circumferentially with respect to the immediately longitudinally adjacent rib on the other side of the helical cut; and (c) the offsetting of the longitudinally adjacent ribs on opposite sides of the helical cut is less than the spacing between circumferentially spaced ribs.

4. A flexible cable assembly according to claim 3, wherein:
the offsetting of the longitudinally adjacent ribs on opposite sides of the helical cut is about half the spacing between circumferentially spaced ribs.

5. A flexible cable assembly according to claim 4 wherein:
there are six circumferentially spaced ribs equally spaced from each other on any single turn of said helical strip along the length of the liner.

6. A flexible cable assembly according to any one of claims 1-5 wherein:
the liner is an extruded tube with said helical cut defining said helical strip.

7. A flexible cable assembly according to claim 6 wherein:
the extruded tube has a torsional stress throughout its length whereby the adjacent turns of the helical strip are shifted circumferentially with respect to each other to effect the circumferential offsetting of ribs on opposite sides of the cut.

8. A flexible cable assembly according to claim 7 wherein:
the strip is shifted in a tightening direction to effect the offsetting of the ribs on opposite sides of the helical cut.

9. A flexible cable assembly according to claim 6 wherein:
the tube material is a mechanically stressed tube whereby the adjacent turns of the helical strip are shifted circumferentially with respect to each other to effect the circumferential offsetting of ribs on opposite sides of the cut.

10. A flexible cable assembly according to claim 9 wherein:
the strip is shifted in a tightening direction to effect the offsetting of the ribs on opposite sides of the helical cut.

11. The flexible cable assembly according to claim 1, wherein said core member has a grooved surface having a predetermined lay, and the lay of said helical strip is the same as that of said core member.

12. A flexible cable assembly according to claim 11, wherein said core member transmits power by rotation in the direction of said lay.

13. A flexible cable assembly according to claim 1, wherein said core member has a grooved surface having a predetermined lay, and transmits power by rotation in such a direction as to resist closing of said helical cut.

14. A flexible cable assembly according to claim 1, wherein the pitch of the turns of said helical cut is approximately ¼-inch to ⅜-inch.

15. A flexible cable assembly according to claim 14, wherein said pitch is substantially ¼-inch.

16. A flexible cable assembly according to any one of claims 1-5 wherein:
the ribs on each turn of the helical strips extend longitudinally across the full width of the turn.

* * * * *

UNITED STATES PATENT AND TRADEMARK OFFICE
CERTIFICATE OF CORRECTION

PATENT NO.   :   4,655,729

DATED        :   April 7, 1987

INVENTOR(S)  :   Louis E. Kottke

It is certified that error appears in the above-identified patent and that said Letters Patent is hereby corrected as shown below:

The Title Page should be deleted to appear as per attached Title Page.

The sheets of drawing consisting of Figures 1 - 6, should be deleted to appear as shown on the attached sheets.

Signed and Sealed this

Fifteenth Day of March, 1988

Attest:

DONALD J. QUIGG

Attesting Officer

Commissioner of Patents and Trademarks

United States Patent [19]

Kottke

[11] Patent Number: 4,655,729
[45] Date of Patent: Apr. 7, 1987

[54] FLEXIBLE CABLE ASSEMBLY

[75] Inventor: Louis E. Kottke, Adrian, Mich.

[73] Assignee: Acco Babcock Inc., Fairfield, Conn.

[21] Appl. No.: 625,601

[22] Filed: Jun. 28, 1984

[51] Int. Cl.$^4$ .................................................. F16C 1/26
[52] U.S. Cl. ............................... 464/58; 74/501 P; 464/174
[58] Field of Search .................. 74/501 P; 464/57, 58, 464/60, 173, 174, 181, 183

[56] References Cited

U.S. PATENT DOCUMENTS

| | | |
|---|---|---|
| 2,382,966 | 9/1945 | Arens . |
| 2,706,417 | 4/1955 | Waner ............................ 464/58 X |
| 2,831,737 | 4/1958 | Jacoby . |
| 2,850,915 | 9/1958 | Bratz . |
| 3,117,371 | 1/1964 | Farley . |
| 3,214,995 | 11/1965 | Gilmore ......................... 464/174 X |
| 3,238,808 | 3/1966 | Barnard .......................... 464/57 X |
| 3,240,233 | 3/1966 | Johnston . |
| 3,302,479 | 2/1967 | Conrad . |
| 3,435,634 | 4/1969 | Chatham ........................ 464/174 |
| 3,481,156 | 12/1969 | Csipkes ........................... 464/57 X |
| 3,581,523 | 6/1971 | Bartholomew ............... 464/174 X |
| 3,812,738 | 5/1974 | Courtot ....................... 74/501 P X |
| 4,112,708 | 9/1978 | Fukuda ............................ 464/57 X |

FOREIGN PATENT DOCUMENTS 1045184  5/1959 Fed. Rep. of Germany .
1294854 11/1962 France .

Primary Examiner—Stuart S. Levy
Assistant Examiner—Daniel P. Stodola
Attorney, Agent, or Firm—Pennie & Edmonds

[57] ABSTRACT

A flexible cable assembly for actuation of an automobile speedometer or the like, comprising an inner core member and a tubular casing that includes an outer housing and a spiral-cut tubular liner with multiple internal ribs. The liner is constructed by extruding a cylindrical tube with at least one internal longitudinally extending rib. The tube is then cut helically so as to offset circumferentially the rib segments on adjacent turns of the strip, providing multiple internal supports for the core member.

16 Claims, 6 Drawing Figures

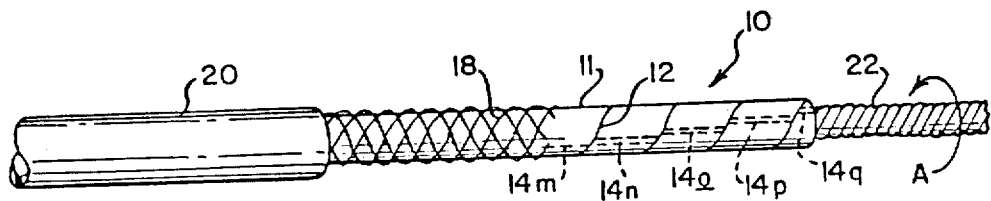

UNITED STATES PATENT AND TRADEMARK OFFICE
CERTIFICATE OF CORRECTION

PATENT NO. : 4,655,729

DATED : April 7, 1987

INVENTOR(S) : Louis E. Kottke

It is certified that error appears in the above-identified patent and that said Letters Patent is hereby corrected as shown below:

FIG. 1

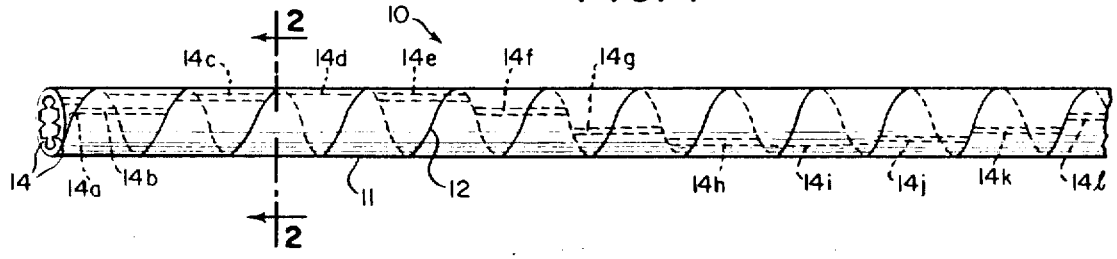

UNITED STATES PATENT AND TRADEMARK OFFICE
CERTIFICATE OF CORRECTION

PATENT NO. : 4,655,729

DATED : April 7, 1987

INVENTOR(S) : Louis E. Kottke

It is certified that error appears in the above-identified patent and that said Letters Patent is hereby corrected as shown below:

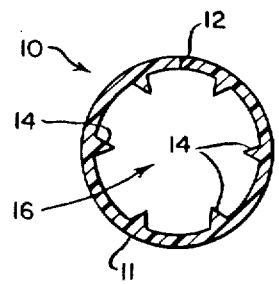

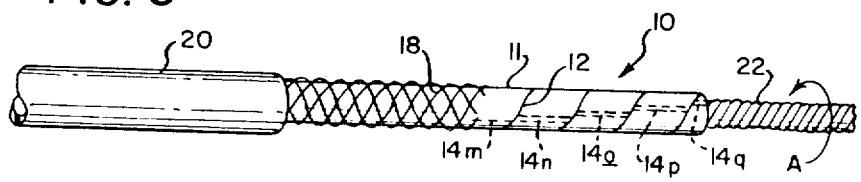

UNITED STATES PATENT AND TRADEMARK OFFICE
CERTIFICATE OF CORRECTION

PATENT NO. : 4,655,729
DATED : April 7, 1987
INVENTOR(S) : Louis E. Kottke

Page 5 of 5

It is certified that error appears in the above-identified patent and that said Letters Patent is hereby corrected as shown below: